(12) United States Patent
Irvine

(10) Patent No.: US 9,485,090 B2
(45) Date of Patent: Nov. 1, 2016

(54) MANAGED AUTHENTICATION ON A DISTRIBUTED NETWORK

(75) Inventor: David Irvine, Troon (GB)

(73) Assignee: SIGMOID SOLUTIONS LIMITED, Troon (GB)

( * ) Notice: Subject to any disclaimer, the term of this patent is extended or adjusted under 35 U.S.C. 154(b) by 236 days.

(21) Appl. No.: 14/008,610

(22) PCT Filed: Mar. 29, 2012

(86) PCT No.: PCT/GB2012/050696
§ 371 (c)(1),
(2), (4) Date: Aug. 5, 2014

(87) PCT Pub. No.: WO2012/131369
PCT Pub. Date: Oct. 4, 2012

(65) Prior Publication Data
US 2015/0026474 A1     Jan. 22, 2015

(30) Foreign Application Priority Data

Mar. 29, 2011   (GB) .................................. 1105242.0

(51) Int. Cl.
*H04L 29/06*     (2006.01)
*G06F 21/00*     (2013.01)
*H04L 9/08*      (2006.01)
*G06F 21/31*     (2013.01)
*G06F 21/46*     (2013.01)
*H04L 9/14*      (2006.01)

(52) U.S. Cl.
CPC .............. *H04L 9/0819* (2013.01); *G06F 21/31* (2013.01); *G06F 21/313* (2013.01); *G06F 21/46* (2013.01); *H04L 9/14* (2013.01); *H04L 63/08* (2013.01); *H04L 63/104* (2013.01); *G06F 2221/2117* (2013.01); *G06F 2221/2145* (2013.01); *H04L 2209/24* (2013.01)

(58) Field of Classification Search
CPC ..... H04L 9/0819; H04L 9/14; H04L 63/104; H04L 63/08; H04L 2209/24; G06F 21/46; G06F 21/313; G06F 21/31; G06F 2221/2145; G06F 2221/2117
See application file for complete search history.

(56) References Cited

FOREIGN PATENT DOCUMENTS

WO      WO 2008154627 A1 * 12/2008 ........... H04L 63/104

OTHER PUBLICATIONS

Park et al. "Trusted P2P Computing Environments with Role Based Access Control", pp. 27-35, Mar. 2007.*

* cited by examiner

*Primary Examiner* — Lisa Lewis

(57) ABSTRACT

An authoritative computer network (10) comprising: at least one manager user (12); a plurality of subordinate users (14); and access control means adapted to allow the manager user to control access of one or more subordinate users to the authoritative computer network, wherein the authoritative computer network is provided as an overlay network on or within a distributed network (100).

21 Claims, 1 Drawing Sheet

MANAGED AUTHENTICATION ON A DISTRIBUTED NETWORK

CROSS REFERENCE TO RELATED APPLICATIONS

This application claims priority to PCT Application Number PCT/GB2012/050696, with an international filing date of Mar. 29, 2012, which claims priority to United Kingdom Patent Application No. 1105242.0, filed Mar. 29, 2011, each of which is herein incorporated by reference in its entirety.

The present invention relates to methods and apparatus for managing authentication of a user on a network. In particular, but not exclusively, the invention relates to controlling access of users to a peer to peer, decentralised or server-less network (hereinafter referred to as a distributed network).

Computer networks may be classified according to the functional relationships which exist among the elements or nodes of the network. Two main examples are the client-server model and peer to peer architecture. The client-server model can provide an authoritative network in which one or more users have greater status than, and can control, other users of the network. In a peer to peer network, typically each user can simultaneously act as both a client and a server, and each has equivalent responsibilities and status.

An overlay network is a virtual computer network that is built on top of another network. Nodes of the overlay network are connected by virtual or logical links, each of which corresponds to a path in the underlying network.

Distributed networks have many advantages over server-client networks, such as allowing data to be spread across many locations for security and ease of access. Also, in a server-client network, the server can become overloaded as the number of simultaneous client requests to a given server increases. In contrast, the aggregated bandwidth of a distributed network actually increases as nodes are added. Also, should a critical server fail, clients' requests cannot be fulfilled, whereas in distributed networks the resources are usually distributed among many nodes.

As another example, GB 1021312.2 discloses a distributed file system (DFS) which can be provided on a peer to peer network and has many advantages over traditional DFSs provided on server-client networks.

Nevertheless, server-client networks are still preferred and most commonly used, especially in corporate settings. This is often due to perceived advantages in authenticating and maintaining control over users. It is widely believed that proper authentication and control of a user on a distributed network is difficult or impossible.

A process for the authentication of a user can be used to provide access to the network. This access may be at a certain level or set of privileges depending on the user or node as determined by the authentication process. Access is typically granted by an authoritative third party who owns or manages the authoritative network or associated resources such as servers.

All known authentication methods that grant access to distributed or shared services require a server or authoritative control in some form. The server typically acts as a login entity for people to connect with prior to gaining access to the network. Also, known authentication methods typically require for any user-name or password containers to be stored, usually on the servers, as lists or similar and these are vulnerable to attack.

It is desirable to provide a network that provides authoritative control and yet one or more advantages of a distributed network. It is desirable to provide an improved method or apparatus for management of user access to a network such as a distributed network. It is desirable to provide a method or apparatus for management of user access to a network which does not require the use of a server or the storage of user identity data.

Within this specification, the term "key" when used in isolation is used in respect to the key of a DHT "key, value" pair. Cryptographic private and public keys will be referred to as private and public keys.

According to the present invention there is provided an authoritative computer network comprising:
 at least one manager user;
 a plurality of subordinate users; and
 access control means adapted to allow the manager user to control access of one or more subordinate users to the authoritative computer network,
 wherein the authoritative computer network is provided as an overlay network on or within a distributed network.

The access control means may comprise user validation data which is required to access the authoritative network. The user validation data may be generatable by the manager user and transmittable from the manager user to the subordinate user.

The generated user validation data may be revocable by the manager user. The generated user validation data may be revocable by the manager user deleting at least a portion of the user validation data.

The user validation data may comprise a user identifier and a user name assigned to the subordinate user. The user validation data may comprise a password. The access control means may be configured to employ a key derivation function to strengthen the password.

The access control means may be configured to derive a salt from the user identifier and the user name. The access control means may be configured to generate a unique identifier using a concatenation of the user name and the salt. The concatenation may be hashed.

The access control means may be configured to generate user account data. The user account data may be encrypted.

The generated user validation data may be digitally signed by the manager user. The generated user validation data may be co-signed by a third party external to the authoritative network. The third party may comprise a system supplier.

The user validation data may be storable on the distributed network. The user validation data may be storable on the authoritative network.

The user validation data may be encrypted. The user validation data may be encrypted using a key pair shared between the manager user and the subordinate user.

The user validation data can also be co-signed by a third party external to the authoritative network, such as the system supplier.

The access control means may be configured to assign a publically broadcastable identity to the subordinate user.

The access control means may include alternative user input means. The alternative user input means may comprise a device the user has access to, such as a mobile phone.

The user identifier may correspond to a telephone number or similar of the mobile device. The access control means may be adapted to transmit a message to the mobile device when the user requests access to the network. The message may be encrypted.

The access control means may be adapted to receive a reply message from the mobile device to authenticate the user. The mobile device may include an application for receiving the sent message and sending the reply message.

The authoritative network may be configured to provide a distributed file system allowing the storage of data on the network, the data comprising a plurality of directories and files arranged in a hierarchical structure.

The stored data may comprise the data of a child directory of the distributed file system. The stored data may comprise a datamap which provides at least one location of the stored data.

The access control means may be configured to assign an identifier to the child directory and to a parent directory for the child directory. The datamap may be encrypted using both the child directory identifier and the parent directory identifier. The encrypted datamap may be stored using at least part of the child directory identifier as the key.

The stored data of the child directory may be accessible using the child directory identifier and the parent directory identifier. The stored data of the child directory may comprise one or more grandchild directories which are accessible using the child directory identifier and a grandchild directory identifier.

The stored data may comprise a second datamap which provides the at least one location of the stored data of the grandchild directory. An identifier may be assigned to the grandchild directory. The second datamap may be encrypted using both the child directory identifier and the grandchild directory identifier. The encrypted second datamap may be stored using at least part of the grandchild directory identifier as the key. The grandchild directory identifier may be derivable from child directory data.

The authoritative network may be configured to split at least one data element to be stored into a plurality of data chunks. At least one data chunk may be stored at a different location on the network to the other data chunks. Each data chunk may be encrypted before storing on the network.

The at least one data element may include the manager user validation data. At least one data chunk of the manager user validation data may be stored at a different location on the network. Each different location may correspond to a particular subordinate user.

The manager user validation data may be reconstructable using less than all data chunks of the manager user validation data. The authoritative network may employ a key sharing scheme such that a particular number of users may reconstruct the manager user validation data.

Embodiments of the present invention will now be described, by way of example only, with reference to the accompanying drawings in which.

Figure 1:
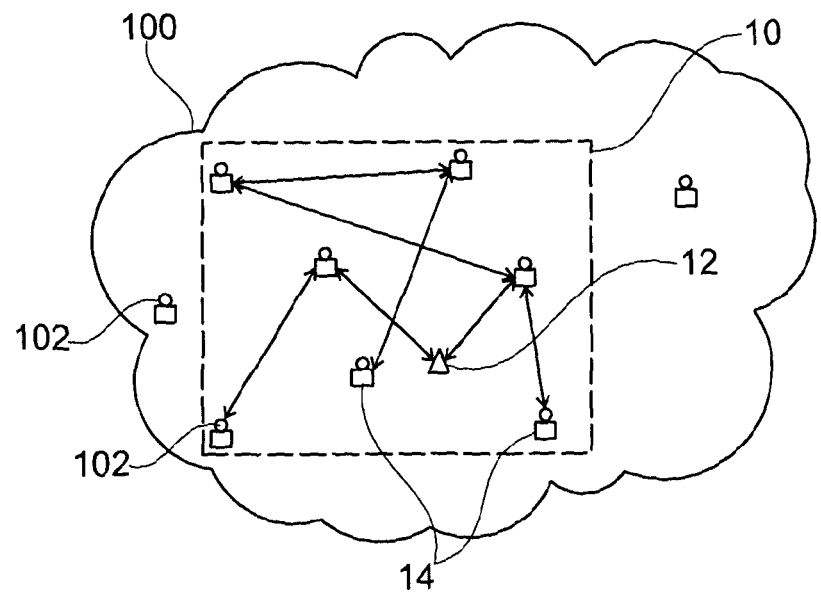
FIG. 1 shows a distributed network and overlaid authoritative network.
Figure 2:
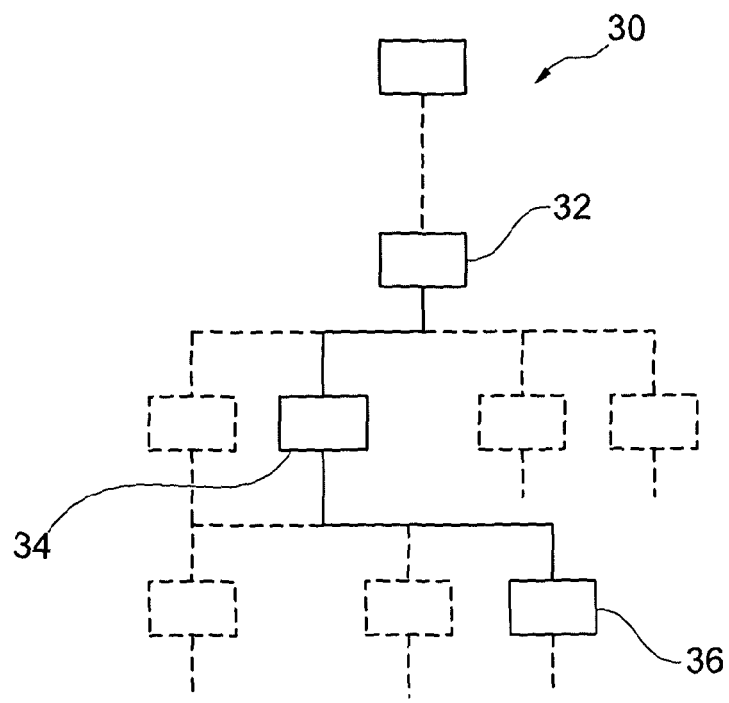
FIG. 2 shows a diagrammatic representation of a hierarchical file structure.

FIG. 1 shows a distributed network 100, such as a peer to peer network, which comprises a number of nodes 102 or devices. According to the protocols of the distributed network 100, each node 102 has equivalent responsibilities and status.

Overlaid on the distributed network 100 is an authoritative network 10 which comprises a manager user 12 and a number of subordinate users 14. In FIG. 1, the distributed network 100 has a greater number of users than the authoritative network 10 but they could be the same size.

Although the manager user 12 and each subordinate user 14 are also members of the distributed network 100, and have equivalent status on that network, the manager user 12 has a greater role and status on the authoritative network 10.

In particular, the authoritative network 10 is configured to provide the manager user 12 with access control means which allows the manager user 12 to control access of the subordinate users 14 to the authoritative network 10.

To join the authoritative network 10, an account must be created for a new user and this account creation process automatically creates a new subordinate user 14 subject to the rules of the authoritative network 10.

To create the account, a user identifier is first assigned to the new user. Two inputs are then required from the user: a user name and a password. The user name is selected by the system, rather than by the user, and the user cannot alter the user name. The user name is not the name broadcast on the network 10 or used to contact other users, rather another name is chosen for that purpose. A key derivation function, such as PBKDF2, can be used here to strengthen any password keys used.

A salt may be derived from the user identifier and the user name or separately input. This is done in a repeatable way such that the manager user 12 can recreate it at any time. To generate a unique identifier, the concatenation of the user name and the salt is hashed.

To ensure the identifier is unique, the system attempts to retrieve data from the address or key that is equivalent to the unique identifier. If this attempt produces a false result, the identifier is unique.

Account data is created and this data specifies session data, like user details or an index of references to further data. This account packet is encrypted and stored on the authoritative network 10 using an access packet holding a random string. The access packet is encrypted and stored on the authoritative network 10 at an address corresponding to the unique identifier. Encryption can be performed using a key pair shared between the manager user 12 and the subordinate user 14.

When the user 14 wishes to login to the authoritative network 10, the random string is retrieved and decrypted using the user name and the salt. The account packet is then retrieved and decrypted using the random string, user name and the salt.

The account and access packets form user validation data which is required to access the authoritative network 10. The user validation data is generated by the manager user 12 and transmitted to the subordinate user 14. The user validation data is signed by the manager user 12 who keeps a copy of the data. This allows the manager user 12 to locate the user validation data and, if desired, delete the data to revoke access to the authoritative network 10.

The user validation data can also be co-signed by a third party external to the authoritative network, such as the software supplier.

During logout, a new random string is generated and the new account packet is stored using the new random string while the old account packet is deleted. Also, the access packet is deleted using the new random string.

To create a publically broadcastable identity, the manager user 12 can create a key pair for the subordinate user 14. A hash of the public key signed by the manager's private key is stored on the network 10. This is also the identifier for the user 14. The manager user 12 creates a broadcastable identity (e.g. User@Org) and a hash of this signed by the manager's private key is stored on the network 10. This is the contact address for the subordinate user 14 and is revocable by the manager user 12.

When there is any communication from the broadcastable identity, a check can be made of the stored information to ensure that the identifier is still valid.

The access control means can include alternative user input means. This is to counter the unauthorised detection or theft of a user's entered inputs such as user name and password, such as using a key logger, over the shoulder attack or similar. The alternative user input means can comprise a mobile device, such as a mobile phone. The user identifier or broadcastable identity can be mapped to the telephone number of the mobile phone.

The access control means can transmit an encrypted message to the mobile device when the user requests access to the network. The mobile device may include an application for receiving the sent message and sending a reply message. The reply message authenticates the user. Therefore, the user is authenticated using something the user has (the mobile phone) as well as something he knows (user name/password).

GB 1021312.2, which is incorporated herein by reference, discloses a distributed file system (DFS) which can be provided on a peer to peer network. The authoritative network 10 of the present invention can be configured to provide a DFS overlaid on the distributed network 100 allowing the storage of data on the authoritative network 10 (or it can be configured to provide data storage on the distributed network 100).

The stored data can comprise directories and files arranged in a conventional hierarchical structure 30. The manager user 12 can create a root or parent directory 32. The data that is available to one or more subordinate users 14 can comprise the data of one or more child 34 (or grandchild 36 etc) directories of the DFS. The data includes a datamap which provides the location of the stored data. This root or parent directory may be immutable to the subordinate user. Additionally the manager may have created subordinate user read only directories that allows the manger to add information the user cannot alter.

The access control means assigns an identifier to the child directory 34 and to a parent directory 32 for the child directory 34. The datamap is encrypted using both the child directory identifier and the parent directory identifier and then stored using part of the child directory identifier as the key.

Decryption of the datamap, and thus access to the stored data of the child directory 32, therefore requires both the child directory identifier and the parent directory identifier. However, the parent directory identifier cannot be derived from the datamap or stored data. Also, the stored data of the parent directory 32 is not accessible using only the child directory identifier and the parent directory identifier.

The stored data of the child directory 34 is accessible using the child directory identifier and the parent directory identifier. Similarly, the stored data of the child directory 34 can comprise one or more grandchild directories 36 which are configured to be accessible using the child directory identifier and a grandchild directory identifier.

A second datamap provides the location of the stored data of the grandchild directory. An identifier is assigned to the grandchild directory 36, and the second datamap is encrypted using both the child directory identifier and the grandchild directory identifier. The encrypted second datamap is stored using the grandchild directory identifier as the key. The grandchild directory identifier is derivable from the child directory data.

Therefore, a subordinate user 14 can, using the child directory identifier and the parent directory identifier, access the data of any grandchild directories 36.

Indeed, a subordinate user 14 can, using the child directory identifier and the parent directory identifier, access multiple levels of stored directories and subdirectories and the associated data under the child directory 34. The subordinate user 14 can drill down and up these levels but not access levels above the child directory 34.

Therefore, the manager user 12 has authoritative control of the DFS and only this user 12 can access all levels including the parent directory 32. A subordinate user 14 may create new subdirectories and/or add files but the manager user 12 can always access these new subdirectories and files.

Data elements to be stored can be split into various data chunks. These data chunks can be encrypted and then stored at different locations on the network 10.

At least one of these data elements can include the manager user's validation data. Different data chunks of the manager user validation data can be stored at different locations on the network 10, each different location corresponding to a particular subordinate user 14.

As the manager user 12 has extensive control and no equivalent, safeguards can be provided as a backup. A key sharing scheme, such as Shamir's scheme, can be used. The manager user 12 can select a number of trusted subordinate users 14 (such as people with high status in the corporate organisation) and share a data chunk of the manager user validation data with each of these users. If necessary, the manager user validation data can be reconstructed using less than all, for instance a majority of, the shared data chunks.

The above embodiment provides an authoritative network 10 which is overlaid on a distributed network 100 and which provides access control to allow the manager user to control access to the authoritative network 10 by subordinate users 14.

In another embodiment, the authoritative network 10 can be configured to generate fallback account packets or user validation data. As with any system, the serialisation and store operation of the account data can fail, resulting in unreadable data upon retrieval. This can affect access to the user's data on the system. To reduce this risk, a fallback copy of the user validation data can be kept to allow reverting to the previous version in the event that the current version can't be restored or has been generated erroneously. As with the main access packet, the fallback access packet can contain a random string, which may be encrypted.

As before, to ensure the identifier is unique, the system attempts to retrieve data from the address or key that is equivalent to the unique identifier. If this attempt produces a false result, the identifier is unique. The same check is made for the fallback access packet. A random string is generated and a fallback copy made.

Initially, the random strings in the access packets are the same, and thus point to the same (unique) account packet. Fallback packets are only kept once the account packet is updated.

At login, the same process is used as before if the account packet can be retrieved. If the retrieval attempt fails, the fallback packets are used.

At logout, the access packet is updated using a new random string, and the fallback access packet is updated using the old random string. The account packet is then updated using the new random string and the old account packet deleted.

The previous account packet is not updated. Instead, the fallback access packet is redirected to it and the normal access packet directed to the new account packet. The previous fallback account packet is deleted. This hinders slow brute-force attacks on decrypting the access packet since, by the time the clear-text random string could be obtained, it would be obsolete.

Whilst specific embodiments of the present invention have been described above, it will be appreciated that departures from the described embodiments may still fall within the scope of the present invention.

The invention claimed is:

1. A computer network configured to provide access to a plurality of member users, the network including:
   a plurality of nodes;
   at least one manager user, for whom a manager key pair exists; and
   at least one subordinate user, for whom a respective user key pair is shared between the manager user and the subordinate user, a hash of each user public key being signed by the manager private key and stored in the network; and wherein
   at least one of the plurality of nodes comprises an access control node adapted to allow the manager user to control access of one or more of the subordinate users to access controlled network resources,
   wherein the access control node is configured to obtain user input including a user name from one of the subordinate users, to generate a unique identifier using the user name, to retrieve an access packet at an address corresponding to the unique identifier, said access packet being encrypted using the user key pair and including a string created from user input credentials and to retrieve an account packet using the string as the network identifier, the retrieved account and access packets forming user validation data.

2. A network as claimed in claim 1, wherein the access control node is further configured to generate user validation data for the manager user and to transmit generated user validation data from the manager user to the subordinate user.

3. A network as claimed in claim 1, wherein the access control node is further configured to revoke the user validation data for the manager user by deleting at least a portion of the user validation data.

4. A network as claimed in claim 1, wherein the user validation data includes a user identifier and the user name assigned to the subordinate user.

5. A network as claimed in claim 4, wherein the access control node is configured to derive a salt from the user identifier and the user name.

6. A network as claimed in claim 5, wherein the access control node is configured to generate the unique identifier by concatenating the user name and the salt and hashing the concatenation.

7. A network as claimed in claim 6, wherein the access control node is configured to generate user account data and to store said data in the account packet using the access packet.

8. A network as claimed in claim 7, wherein the user account data is encrypted.

9. A network as claimed in claim 7, wherein the user account data is obfuscated.

10. A network as claimed in claim 1, wherein the user validation data includes a password, and wherein the access control node is configured to employ a key derivation function to strengthen the password.

11. A network as claimed in claim 1, wherein the user validation data is digitally signed by the manager user.

12. A network as claimed in claim 11, wherein the user validation data is co-signed by a third party external to the network.

13. A network as claimed in claim 1, wherein the access control node is configured to assign a publically broadcastable identity to the subordinate user.

14. A network as claimed in claim 1, wherein the access control node includes alternative user input means, the alternative user input means being an additional device to which the user has access, the user having been assigned a user identifier and the user identifier corresponding to a unique identifier of the additional device.

15. A network as claimed in claim 14, wherein the access control node is further adapted to transmit a message to the additional device when the subordinate user requests access to the network.

16. A network as claimed in claim 15, wherein the message is encrypted.

17. A network as claimed in claim 15, wherein the access control node is further adapted to receive a reply message from the additional device to authenticate the subordinate user.

18. A network as claimed in claim 17, wherein the additional device includes an application for receiving the sent message and sending the reply message.

19. A network as claimed in claim 1, wherein the network is configured to provide a distributed file system allowing the storage of data on the network, the data comprising a plurality of directories and files arranged in a hierarchical structure.

20. A network as claimed in claim 1, wherein the access packet includes the private key from the user key pair.

21. A method of controlling user access to network resources in a computer network having a plurality of member users including at least one manager user, for whom a manager key pair exists, and a plurality of subordinate users, for whom a respective user key pair is shared between the manager user and the subordinate user, the method comprising:
   hashing a public key of the user key pair;
   signing the hash with a private key of the manager key pair;
   storing the signed hash in the network;
   obtaining user input from one of said subordinate users, said input including a user name;
   generating a unique identifier using the user name;
   retrieving an access packet at an address corresponding to the unique identifier, said access packet being encrypted using the key pair and including a random string; and
   retrieving an account packet using the random string, the retrieved account and access packets forming user validation data which is required to access the computer network.

* * * * *